(12) United States Patent
Yue

(10) Patent No.: US 8,156,200 B2
(45) Date of Patent: Apr. 10, 2012

(54) SYSTEM AND METHOD FOR BUILDING AN INFORMATION WEB WITH PAGES ADDRESSED BY PHONE NUMBERS, WHICH ENABLES PHONE USERS AND COMPUTER USERS TO CREATE, ADMINISTER, PUBLISH AND ACCESS WEB PAGES ADDRESSED BY PHONE NUMBERS

(76) Inventor: Dongxiao Yue, Union City, CA (US)

( * ) Notice: Subject to any disclaimer, the term of this patent is extended or adjusted under 35 U.S.C. 154(b) by 2308 days.

(21) Appl. No.: 10/319,226

(22) Filed: Dec. 12, 2002

(65) Prior Publication Data
US 2004/0083114 A1 Apr. 29, 2004

(51) Int. Cl.
*G06F 15/16* (2006.01)
(52) U.S. Cl. ........................................ 709/219
(58) Field of Classification Search ............ 709/219
See application file for complete search history.

(56) References Cited

U.S. PATENT DOCUMENTS

| | | | | |
|---|---|---|---|---|
| 6,594,254 | B1 * | 7/2003 | Kelly | 370/352 |
| 6,708,214 | B1 * | 3/2004 | La Fleur | 709/226 |
| 6,829,233 | B1 * | 12/2004 | Gilboy | 370/352 |
| 7,593,355 | B1 * | 9/2009 | Surazski et al. | 370/261 |
| 2001/0037380 | A1 * | 11/2001 | Wall et al. | 709/219 |
| 2001/0054115 | A1 * | 12/2001 | Ferguson et al. | 709/248 |
| 2002/0052912 | A1 * | 5/2002 | Griswold et al. | 709/200 |
| 2002/0077085 | A1 * | 6/2002 | Kalish et al. | 455/414 |

OTHER PUBLICATIONS

Guthery et al. "How to Turn a GSM SIM into a Web Server"; submitted for CARDIS 2000.*
Vaha-Sipila; "URLs for Telephone Calls"; RFC 2806, Apr. 2000.*
Lee et al.; "Integrating Global Wireless Systems With IP"; Wireless Communications and Network Conference, 2000. pp. 232-236 vol. 1.*

* cited by examiner

*Primary Examiner* — Ajay Bhatia
*Assistant Examiner* — Lin Liu

(57) ABSTRACT

A method and system for creating an information network in which web pages are addressed by phone numbers, which enables phone users and computer users to create web pages with phone numbers as the basis of URLs, and enables computers and phone terminals, including fixed phones, IP phones and mobile phones to have the capability to access and display the phone number addressed web pages. The current invention designs system architectures which consist of centralized and embedded page servers, phone number to page server network address lookup services, proxy servers, and phone terminals with browser capability to access and display phone number addressed web pages. In this system, the browser sends access requests via a proxy server or directly to the page server which hosts the pages, the page server's network address is resolved by querying the phone number—page server address lookup service.

1 Claim, 3 Drawing Sheets

SYSTEM AND METHOD FOR BUILDING AN INFORMATION WEB WITH PAGES ADDRESSED BY PHONE NUMBERS, WHICH ENABLES PHONE USERS AND COMPUTER USERS TO CREATE, ADMINISTER, PUBLISH AND ACCESS WEB PAGES ADDRESSED BY PHONE NUMBERS

BACKGROUND OF INVENTION

1. Field of Invention

This invention relates generally to data communication and network computing, and in particular to phones and computers communicating with network servers that provide hypermedia information through a data network. The data network can be the Internet, the phone network or a wireless network; the phones can be fixed phones, mobile phones or IP phones.

2. Description of the Related Art

Currently, there are far fewer Internet users than phone users, and even fewer people or businesses have their own web pages. Globally, for most people, internet domain names and URLs are still unfamiliar concepts. To create a web site, one has to find a web server host, and create web pages under certain internet domain and path. A URL (uniform resource locator) of a web page includes a domain name and file path. To exchange and remember such lengthy URLs is difficult, to establish and publish a web site is even more difficult, especially for non-technical people. Such difficulty has greatly limited the use of the web as an information network. For most people, the main use of surfing online is to access a limited number of well-known web sites, not to publish information. Users' participation on the internet is mostly one-way download of information. The potential of the network is far from fully exploited.

The purpose of this invention is to solve the problem of the difficulty in creating and publishing conventional web pages addressed by internet domain names, and to make it possible for all phone users to easily create web sites and access web pages addressed by their phone numbers.

SUMMARY OF INVENTION

A system and method for building an information network with web pages addressed by phone numbers, which enables phone users to create web pages which use phone numbers as web addresses, and enables computers and phone terminals, including fixed phones, IP phones and mobile phones to have the capability to access phone number addressed web pages. The current invention designs system architectures which consist of centralized and embedded page servers, phone number to page server address lookup services, proxy servers, and phone terminals and web browsers with the capability to access and display phone number addressed web pages. Compared to internet domain names, addressing web pages with phone numbers has its advantages. Phone number is an existing global naming system, a phone number has an established association with an entity such as an organization or an individual. Using phone number as web address, there is no need for hard to remember or conceptually new addressing schemes such as internet domain name based URLs, IP addresses, etc. The current invention will lead to new integrated information service which enable all phone users to create and publish their own web pages. The invention will greatly expand the online web, as common people will be able to create their own always on, always available web sites, using their phone numbers as web addresses.

BRIEF DESCRIPTION OF DRAWINGS

The present invention includes the designs of six system architectures, which are listed below.

DETAILED DESCRIPTION

Figure 1:
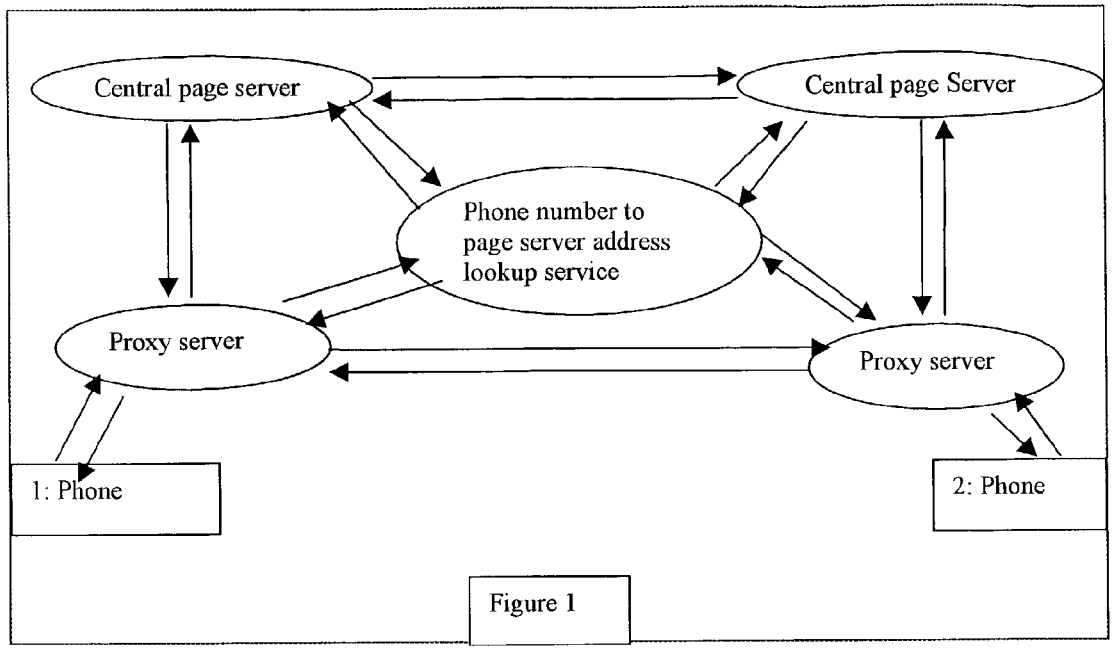
FIG. 1 shows a system organization that includes central page servers, proxy servers, and phone number-page server address lookup services and phone terminals with browsers.

The purpose of this invention is to make it possible for phone users to create and access web pages addressed by their phone numbers.

We define web pages as collections of remotely hosted information and interactive programs, the organization of such data is done by using text based markup languages, including but not limited to HTML, HDML, WML, XML, VXML and SGML, but can also be done by using newly designed data format. The contents of the web pages include but not limited to information such as text, image, voice and interactive programs such as guest books, calendars, web email, web page editing and web page access control administration applications.

This invention establishes a method for building an information web where web pages are addressed by phone numbers. This invention will lead to the development of a new type of information service, which will enable users of fixed phones, IP phones, mobile phones and computers to create, publish, maintain and access web pages which are addressed by phone numbers.

For easier reference, we refer to a web page addressed by a phone number as a PHONE NUMBER WEB PAGE, or a PHONE WEB PAGE, we refer to the network of all phone web pages as PHONE NUMBER WEB, or simply PHONE WEB.

In this invention, the URL of a web page addressed by a phone number is expressed as PNW://N/PATH. Here, PNW is a fixed protocol label, N is a phone number (such as 1-510-123-4567), N may also include an extension number; PATH is a pointer to a file under a directory of arbitrary number of levels. The meaning of PNW protocol label is Phone Number Web, this label may change when the protocol is finalized, but the spirit remains the same. The elaborate form of the phone number N includes country code and area code. But some prefixes may be omitted for addressing purpose, depending on the settings of the browsers. For an internal network of an organization, extension number alone may suffice. The hyper links in the phone number web pages point to such URLs. The network protocol for accessing the phone number web pages can be similar to the HTTP protocol, including GET and POST commands.

For example, suppose the phone number of device A is N, then the address of the top level web page (or home page) for that phone number is PNW://N in the phone web system. This home page address can also be expressed as PNW://N/, where / is the path component separator. Under /N/, there can be any number of levels of sub pages, e.g., /N/admin/ is the web page administration interface, /N/profile/ is the profile of the user, /N/email/ is an email interface, and /N/fax/ is an e-fax interface, such and such. User of A manages its own web pages via /N/admin/, when user of device B needs to retrieve the profile information of user of A, device B accesses the page at /N/profile/, when user of B wants to send e-fax, data will be transmitted to /N/fax/.

By using phone number addressed web URLs, a phone number can be used not only to conduct voice conversation but also used to access its phone number web pages. To the user, all that needed is the phone number. A user does not need to use a new naming system, the existing phone numbers are sufficient for accessing these additional functions.

To access the phone number web, an extended web browser is needed, such browsers must be able to understand the PNW URLs and must be able to access and display web pages addressed by such URLs. For example, a mobile phone user can use a new type of mobile phone equipped with such browsers to access phone number web pages. On this type of new mobile phones, there is a real or virtual key, when a number is displayed on the screen of the phone, pressing the key will result in the retrieval and display of the phone web page for the displayed number. A computer user accesses a phone number web page by clicking a link displayed on a browser window, just like we visit current internet domain name based URLs. The difference is, in the present invention, the URL is based on phone number. We express this kind of URL as PNW://N/path/, where N is a phone number. The hyper links in a phone web page point to such URLs.

The current invention will enable phone users to establish web sites addressed by their phone numbers, the other phone users or computer users can access these sites using the phone numbers, subject to certain access control constraints. Such accesses include not only downloading of information, but also bi-directional information exchanges and execution of interactive programs. In the mobile phone area, currently the information mainly flow to the calling phone number, such as SMS messages. This invention will open up the information flow in the other direction, that is to logically retrieve information from a phone number.

In order to realize a phone number web in which web pages are addressed by phone numbers, various hardware and software must be developed, and new services must be provided. A system must be designed to make it easy for all phone users to create and publish phone number web pages. In the following, we will describe how to build such a system.

Technical Implementation Schemes

Based on the way of storing the web page data, we can categorize the implementation into two basic types and one mixed type.

In the first basic type, the data for the phone number web pages is stored in one or many central servers. Phone devices are clients of such servers, they act as browsers only.

In the second basic type, the web pages are stored directly in the phone terminal device, an embedded web page server runs inside the phone device. To access the pages, a client communicates directly with the embedded server and issues access commands. Of course, this type of implementation has higher requirements for the phone device, as such terminals must have functions of both a browser and a server, and should have enough storage capacity for the contents it serves. However, in the foreseeable future, such devices can be economically produced as technology advances.

The third type is a mix of the two basic types, under this architecture, part or all of the web site data is stored on a central server, and part or all the data also exists on the embedded server running inside a user terminal device. The central server and the user terminal corporate through a proxy server and/or a synchronization process to provide the most up to date information.

This invention focuses on the application layer. For the concrete implementation, including data transport methods, existing technologies and protocols such as TCP/IP, Mobile IP and HTTP can be utilized, or new technologies and protocols can be developed.

For an implementation, some or all of the following components will be developed.

1. Phone Web Page Server

This is a server running continuously to serve web pages. Its most basic functions are storing and publishing web pages addressed by phone numbers. To be immediately useful, it should also provide essential functions to create, modify, delete and administer web pages and control the access rights of the web pages. The implementation of this server can base on the framework of existing HTTP (Hypertext Transfer Protocol) servers.

There are two type of the Phone Web Page Server, one is centralized, the other is embedded.

A) Centralized Phone Web Page Server

This type of page server provides service for a set of phone numbers. Because the space of the phone number is huge, i.e., the number of phone numbers is huge, it is necessary to divide the phone number space into many sub-spaces according to common prefixes such as country code, area code and further prefixes, and let a central server serve only the phone numbers within a specific sub-space. However, the central server can also have proxy capability: when a page access request refers to a page residing on a different server, this server can access the page on behalf of the requester, and either returns the results or redirects the requester to the right destination. The communication link between central servers can be a TCP/IP network, but can also be other types of network.

It's important to note that it is not necessary to host web site for each given phone number on a separate real or virtual page server. To provide web page service to the masses, it's far easier to serve many phone numbers from centralized servers.

For those who have their own phone web page servers, a proxy or redirection mechanism can be implemented at the central server to direct visitors to the right web address.

B) Embedded Page Server

This type of page server resides inside a phone terminal device (such as a mobile phone), it provides page storage and publication service only for the phone number of the terminal device in which it's embedded.

In the direct mode, a user terminal (such as a cell-phone) connects directly to the embedded server, and accesses the information it serves according to certain access control rules.

Obviously, under the direct mode, the pages are available only when the terminal device is powered up and the embedded server is running.

In the mixed mode, the phone web pages can reside simultaneously on a central server and the embedded server, the two types of servers synchronize their data according to certain algorithms. For example, relatively static information, such as organization and personal profiles do not change much over time, they do not need frequent synchronization, on the other hand, dynamic information, such as product prices and schedules need frequent synchronization.

2. Phone Web Page Browser

This is an extended web browser which is phone number web aware, that is, it can access and display URLs with the PNW protocol label.

3. Phone or Terminal Device Equipped with Phone Web Page Browser

This is a device that can access and display web pages addressed by phone numbers. Its function is to issue access requests to page servers or proxy servers for web pages addressed by phone numbers, and to display the retrieved pages.

When a phone number is displayed on such a terminal, a user can press a real or virtual key to access the phone web pages corresponding to that number.

4. Proximity Proxy Server

A web browser can connect directly to a phone web page server via a network; however, a more efficient way is using a proximity proxy server as an intermediate. Under this scheme, a browser is assigned a proxy, all page requests are sent to this proxy, the latter handles the process of the page accessing and returns the results to the browser.

A proximity proxy server is especially beneficial in a wireless environment, such as in a wireless phone or data network, where the browser is on a mobile phone, a PDA or a mobile computer and bandwidth is limited.

5. Phone Number to Page Server Address Lookup Service

This is a directory service whose main function is to find the network address of the corresponding phone web page server for a given phone number. Basically, it's a database that tracks and tells which server is serving which phone number's web pages. To access a phone number web page, a browser must use the address lookup service to resolve the network address of the page server for the given number.

The simplest form of such a service can be a fixed algorithm that maps a phone number to an internet address. Or, we can have a huge global database which tracks all phone numbers. However, a more flexible and scalable way is to use a tree architecture similar to the DNS (Domain name service). In fact, to look up the page server from a phone number is similar to the inverse lookup of a domain name from an IP address using the in-addr.arpa domain tree. Although a phone number, unlike an IP address, does not have a fixed length, it's not difficult to use country code, area code and other prefixes to divide the phone number space. For example, to query for a number such as 15101234567, we first contact the root page server address lookup service S., which knows about countries and redirects us to the server S.1 for country code 1 (for USA), then by querying the same number at S.1, we are redirected to server for the 510 area code, which we call S.1.510, the process can continue, until at some level, the address lookup service is able to provide the page server information for the number 15101234567. Suppose S.1.510 knows that all phone numbers starting with 1510123 are served by the page server at, say, pnw1510123.net, it will return that information and the query will end. Obviously, in this example, the S.1.510 server can also be programmed to handle exceptional cases, for example, the page server for 15101234568 might be handled by a different and dedicated server.

Although the way of organizing a tree of number to page server lookup services using country code, area code and other prefixes is just one possible solution, it's probably the most natural, it is also an efficient solution which does not require too many levels of recursive lookups.

The underlying network address of a phone web page server depends on the properties of the data network. For instance, if the pages are stored on a phone web page server connected to the internet, then the page server's real address includes internet domain name and port number. To retrieve a phone web page, a translation table is consulted by the address lookup service to map the phone number to the page server address, and the proper protocol must be used to retrieve the page from this server address by supplying the phone number and path. This process of address lookup and access can be done directly by the browser, but can be more efficiently handled by proxy servers, as the latter can cache the phone number-page server address translation table and page content in storage buffers to increase performance.

The essential steps in accessing phone web pages are discussed below.

Given a phone number, the main steps in accessing the corresponding phone web page are as following, these steps are carried out by either a browser or a proxy server, depending on the system architecture we choose:

1) Obtaining the network address of the corresponding phone web page server by querying a phone number-page server address lookup service.

2) Connecting to the page server at the address obtained in 1) and issue access commands. The command includes command type code (such as GET or POST), phone number, page path, and other parameters and data, such as identity information of the visitor.

3) The page server returns the page data accordingly. The returned information shall include data type, data size and data content.

It's helpful to give a concrete example to illustrate the above steps. Assume that the phone number web page addressed by 15101234567 is hosted by the server pnw1510123.net, and assume that the address lookup service uses a DNS type structure, with country code and area code to separate the levels, the steps to retrieve the page at URL PNW://15101234567/profile/ are:

1) Query the assigned phone number—page server address lookup service with the phone number 15101234567 as input, the result is pnw1510123.net.

2) Connect to the server pnw1510123.net at a predefined port number, and send a command similar to this:

GET/15101234567/profile/

3) The page server sends back the page, which can be an HTML page, for example:

```
<HTML>
<BODY>
<A HREF="PNW:/ / 15101234566/profile/index.html">
The number has changed, please go to here</A>
</BODY>
</HTML>
```

The above HTML code includes a link to another page addressed by another phone number. This code is eventually processed and displayed on a browser.

Below, we use diagrams to further demonstrate some of the possible system architectures.

FIG. 1 shows a system organization that includes central page servers, proxy servers, number-address lookup services and phone terminals with browsers. In FIG. 1, (1) and (2) are phone terminals with browser capability. The terminals access the called number's web page via the proxy servers. The proxy server obtains the address of the page server via the phone number-page server address lookup service, accesses the page on behalf of the client and returns the data back to the user terminal.

Figure 2:
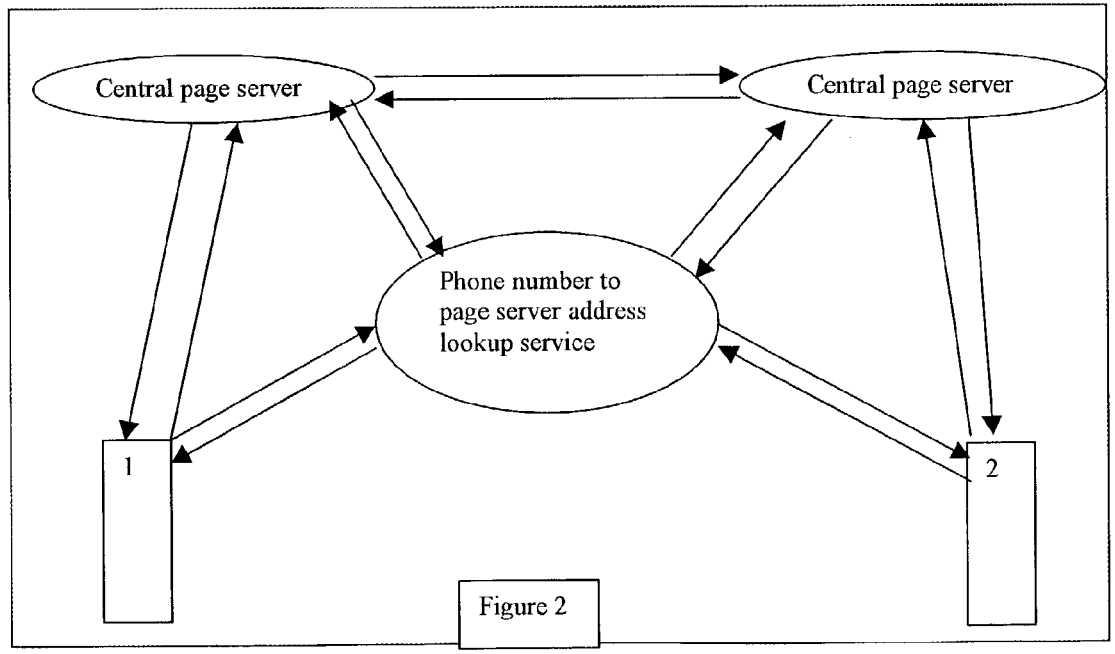
FIG. 2 shows a system organization that includes central page servers, phone number-page server address lookup services and phone terminals with browsers.

FIG. 2 shows a system organization that includes central page servers, number-address lookup services and phone terminals with browsers. In FIG. 2, (1) and (2) are phone terminals with browser capability. A terminal obtains the address of the page server via the phone number-page server address lookup service, accesses the page directly at the page server.

Figure 3:
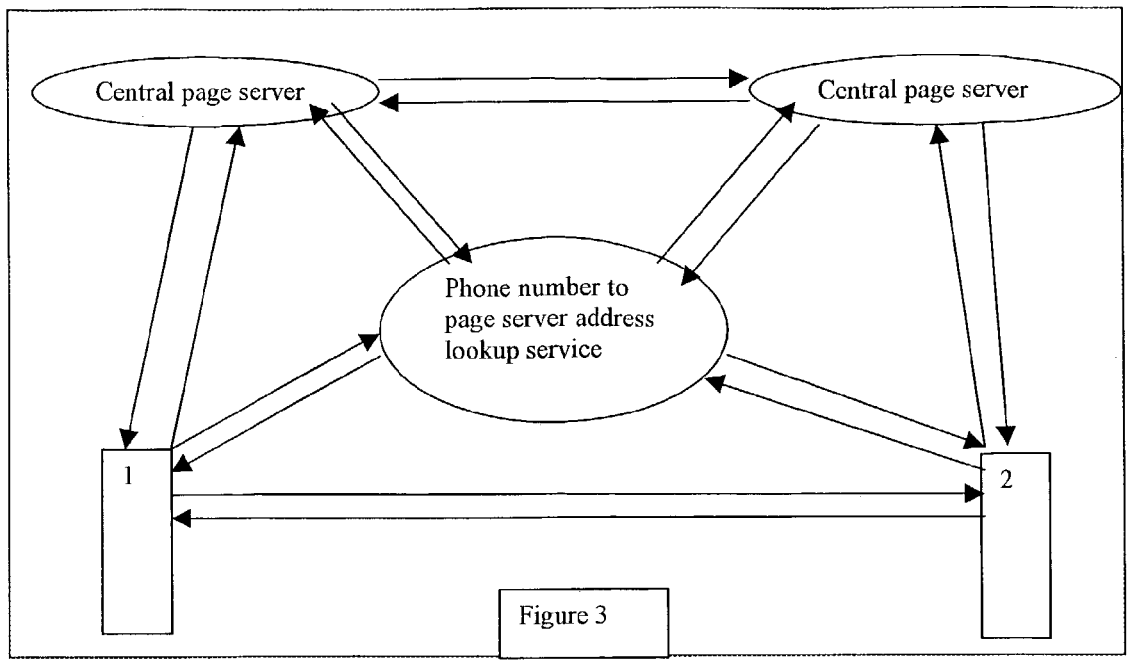
FIG. 3 shows a system organization that includes central page servers, phone terminals with embedded page servers, phone number-page server address lookup services and phone terminals with browsers.

FIG. 3 shows a system organization that includes central page servers, phone terminal with embedded page server, number-page server address lookup service and phone terminals with browsers. In FIG. 3, (1) is a phone terminal with browser, (2) is a phone terminal with embedded server. (2) has both a browser for phone web pages and an embedded page server. (1) can obtain the address of the calling number's central page server, and access the pages. Or, (1) can connect directly to the embedded page server and access the pages.

Figure 4:
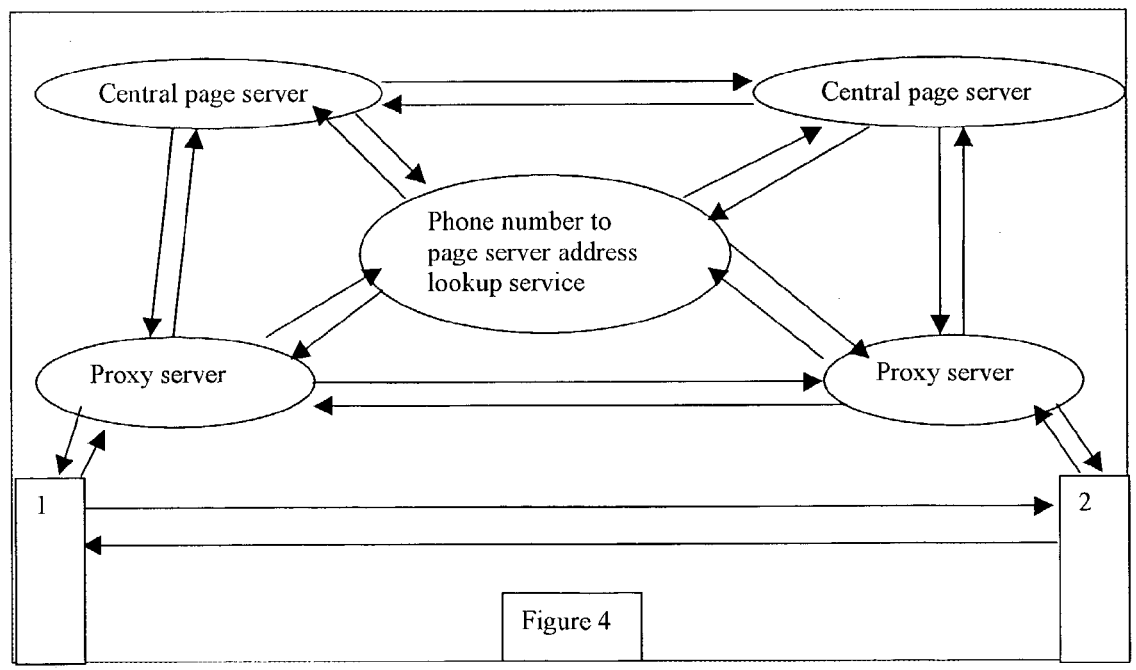
FIG. 4 shows a system organization that includes central page servers, phone terminal with embedded page server, proxy servers, phone number-page server address lookup services and phone terminals with browsers.

FIG. 4 shows a system organization that includes central page servers, phone terminal with embedded page server, proxy servers, phone number-page server address lookup service and phone terminal with browser. In FIG. 4, (1) is a phone terminal with browser, (2) is a phone terminal with embedded page server. (2) has both a browser for phone web pages and an embedded page server. (1) can access the pages via a proxy server, or it can connect to the embedded page server and access the pages directly.

Figure 5:
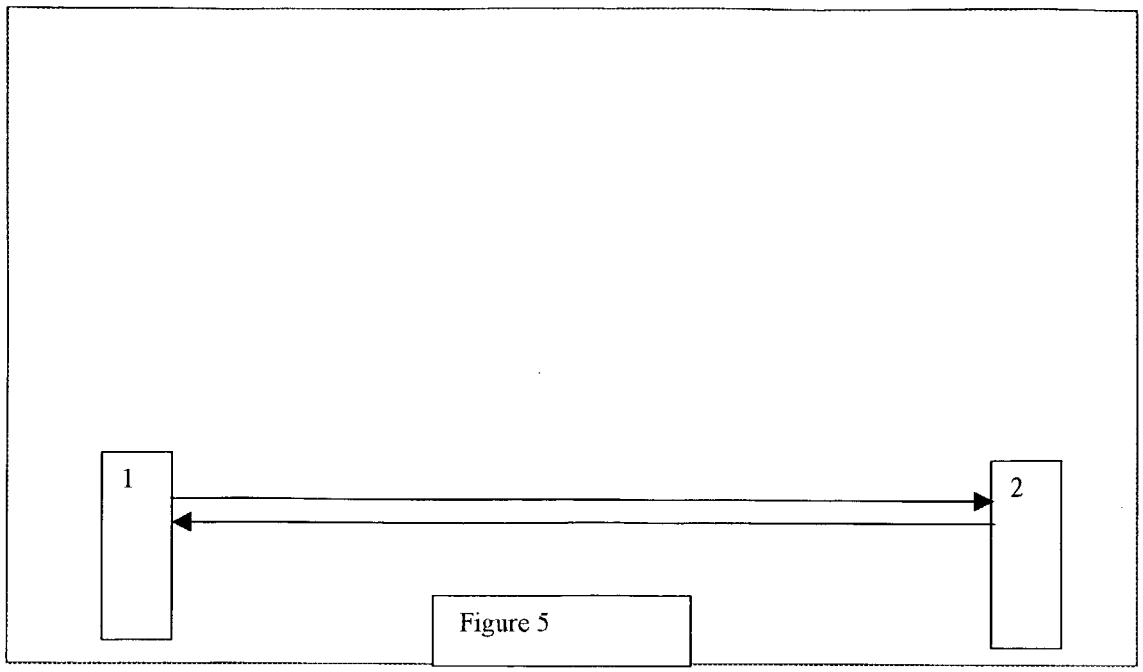
FIG. 5 shows a system organization that includes phone terminals with embedded page servers and browsers.

FIG. 5 shows a system organization that includes phone terminal with embedded page server and browser. In FIG. 5, (1) is a phone terminal with browser, (2) is a phone terminal with embedded page server. (1) accesses the pages on (2) directly.

Figure 6:
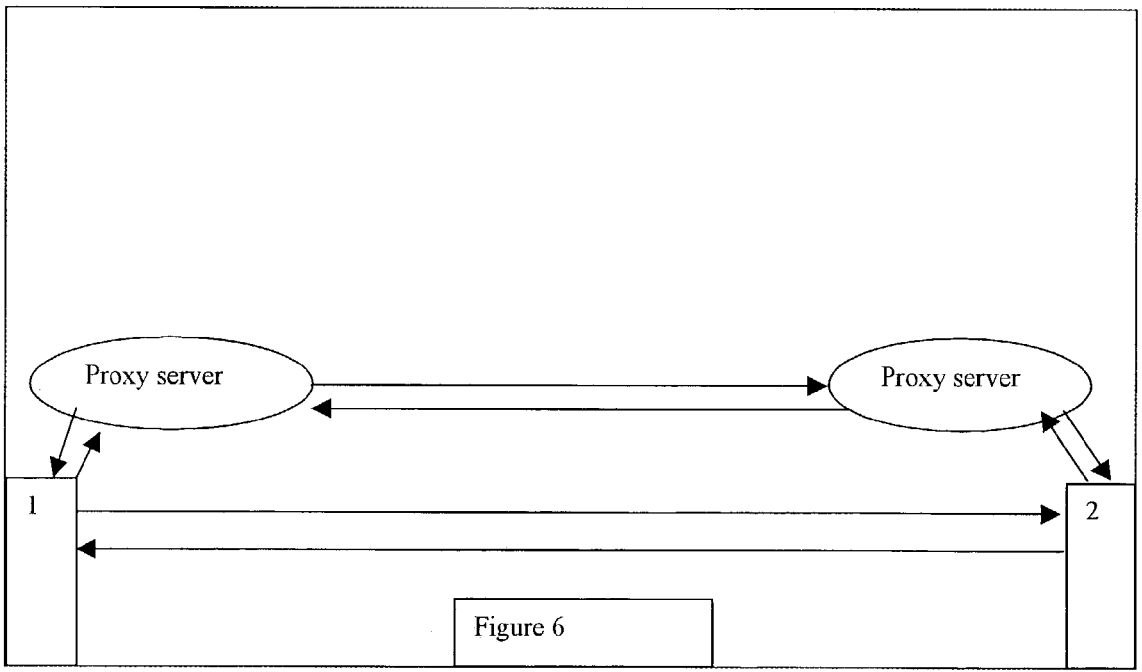
FIG. 6 shows a system organization that includes phone terminals with embedded page servers, proxy server and phone terminal with browsers.

FIG. 6 shows a system organization that includes phone terminal with embedded page server, proxy server and phone terminal with browser. In FIG. 6, (1) is a phone terminal with browser, (2) is a phone terminal with embedded page server. (1) can access page in (2) directly, or it can access the pages via the proxy servers.

THE EFFECT OF THIS INVENTION

The application of this invention will allow a new type of integrated information service to be offered to phone users, the service enables phone users to create their own web pages which are accessed by using their phone numbers, allowing phone users to easily publish information and service on the network.

With the application of this invention, we will see the following effect

*) Phone users can use new type of phones or computers to create web pages addressed by phone numbers, using an integrated service.

*) Using new type of phone terminals, when a phone number is displayed, the user can press a key to visit the corresponding web page. For example, when caller ID is displaying the phone number, the user can immediately access the caller's page to view information. As another example, given a phone number of a business, a user can immediately use the phone number to access the business' web pages and inquire about products and services.

What claimed is:

1. A system for building an information web with web pages addressed by phone numbers, which enables phone users and computer users to create, administer, publish and access said web pages, the system comprising;

one or more central page server computers that store and publish web pages addressed by phone number; and one or more proxy server computers that map a phone number to a network address of at least one of said central page server computers, and one or more remote phone devices with a web browser;

one or more embedded page server computers reside inside the one or more remote phone devices;

the web browser resolves a web page address for said phone number by querying said one or more proxy server computers for mapping said phone number to the network address of the at least one central page server computer, and access and display the web page addressed by the phone number included in a uniform resource locator (URL);

the accessed web page can either be resided on a central page server computer or on an embedded page server computer, whereby a synchronization mechanism is used to maintain a coherence of data on a central page server and the embedded page server;

the one or more proxy server computers comprise naming services operating in conjunction with a DNS like tree structure with a country code, area code, exchange number and other prefixes as a level divider;

the one or more central page server computers have integrated function for creating, updating, deleting, publishing, maintaining and administering phone number addressed web pages;

the web page addressed by the phone number included in a URL is expressed as PNW://PHONE NUMBER/PAGE PATH, with PNW being a protocol label, PHONE NUMBER being a phone number, and PAGE PATH being a path referencing a specific sub level page, which can be data or an application program;

the one or more remote phone devices is selected from a group consisting of a fixed phone, an IP phone, a wireless phone, a PDA or a personal computer.

* * * * *